July 1, 1930.  R. S. STEWART  1,768,719
ANNEALING POT
Filed Oct. 12, 1927
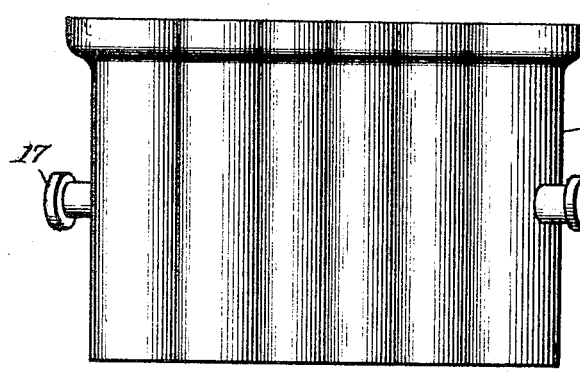
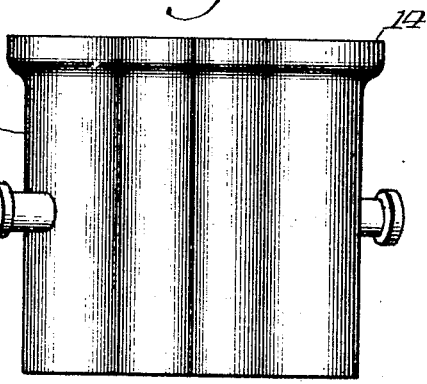
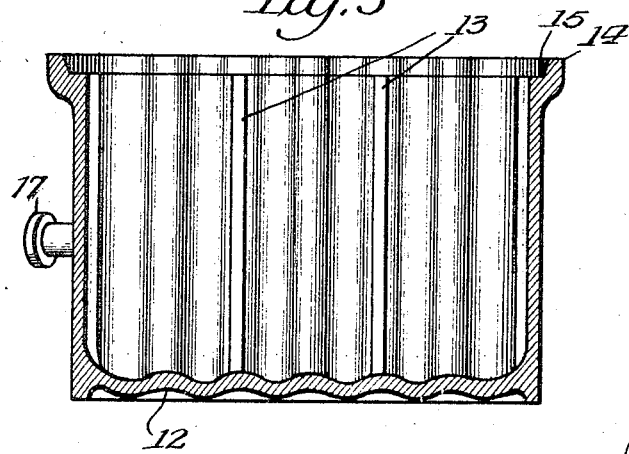
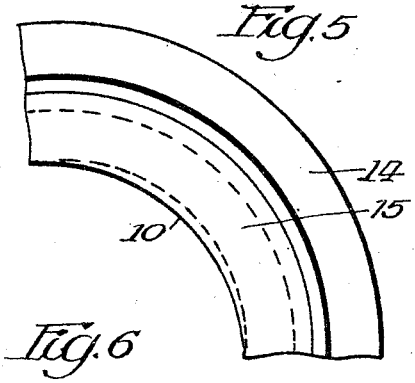
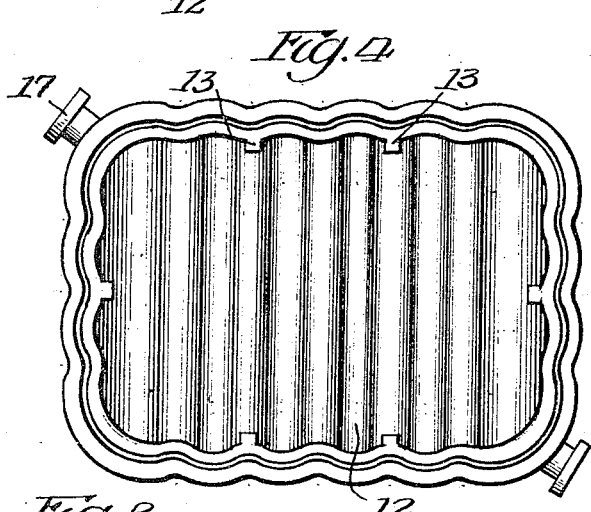
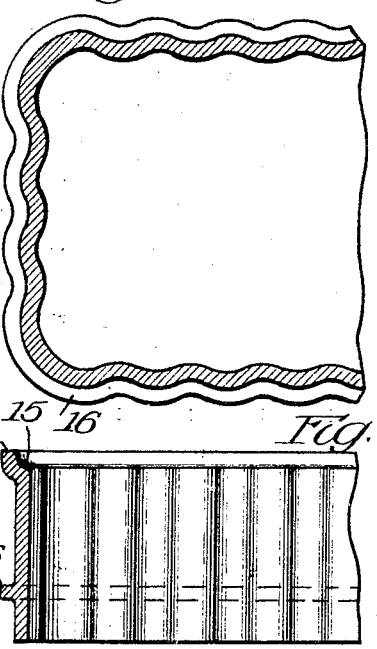
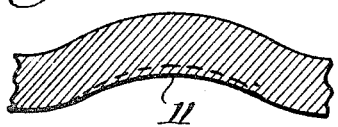
Inventor
Robert S. Stewart
By Wm O Bell Atty.

Patented July 1, 1930

1,768,719

UNITED STATES PATENT OFFICE

ROBERT S. STEWART, OF CHICAGO, ILLINOIS, ASSIGNOR TO THE AMERICAN BRAKE SHOE & FOUNDRY COMPANY, OF NEW YORK, N. Y., A CORPORATION OF DELAWARE

ANNEALING POT

Application filed October 12, 1927. Serial No. 225,654.

This invention relates to annealing pots and it has for its object to lighten the weight of the pot by reducing its wall section, and thereby shortening the heating cycle to obtain desired heat penetration without weakening the pot or lessening its life.

Another object of the invention is to corrugate the walls of an annealing pot to strengthen them and to provide an enlarged surface area for heating.

Another object of the invention is to increase the thickness of the corrugated walls of an annealing pot opposite the convex surfaces of the corrugations on the outer faces of the walls to compensate for the excessive wear or oxidation to which these surfaces are subjected in the practical use of the pot.

And further objects of the invention are to provide an annealing pot with corrugations extending vertically throughout its walls to strengthen the side walls while permitting a reduction in the section thereof; to reinforce the walls of an annealing pot on the interior thereof opposite the convex surfaces on the exterior thereof to prolong the life of the pot and prevent it from cracking under the strains of expansion and contraction due to heating and cooling; to reinforce and strengthen the walls and to provide an enlarged seat to receive the bottom of another pot in stacking by the provision of vertical ribs on the walls, which are located on convex surfaces of the walls within the pot; and to provide a corrugated bottom for the pot.

Referring to the drawings,

Fig. 1 is a side elevation and Fig. 2 is an end elevation of a closed bottom pot embodying the invention.

Fig. 3 is a longitudinal sectional view of the pot shown in Figs. 1 and 2.

Figure 4 is a top plan of the pot shown in Figures 1 and 2.

Fig. 5 is a detail enlarged plan view of one corner of the pot.

Fig. 6 is a horizontal sectional view and Fig. 7 is a vertical sectional view of an open bottom pot embodying the invention.

Fig. 8 is a detail transverse sectional view through a corrugation of the pot.

Referring to Figs. 1-4 of the drawings the pot 9 is substantially rectangular in shape and its walls are provided with a plurality of vertical corrugations which merge with the rounded corners. Each corner is reinforced with excess metal 10, Fig. 5, inside of the pot and the convex surface of each corrugation within the pot is also reinforced with excess metal 11, Fig. 8. Corrugating the walls of the pot reinforces and strengthens the walls which permits them to be made relatively thin, and this not only reduces the weight of the pot, but also enables the heat for annealing castings in the pot to pass more quickly through the walls of the pot.

The convex surfaces on the outside of the pot will wear more rapidly than the concave surfaces because they will be attacked more severely by the flames, and I compensate for this wear and oxidation of the convex surfaces on the outside of the pot by providing excess metal 10 and 11 at the concave surfaces on the inside of the pot and thereby provide a pot with relatively thin walls reinforced and strengthened to provide for long service. The corrugations enlarge the surface area on the outside of the walls of the pot which supplies a greater heating surface than if they were flat.

The invention may be embodied in a closed bottom pot as shown in Figs. 1-4, or in an open bottom pot, as shown in Figs. 6 and 7, and the bottom 12 may be corrugated as shown in Figs. 3 and 4, or it may be made in any other desired form. Vertical ribs 13 may be provided on the inside of the walls of the pot to reinforce and strengthen the walls of the pot and they are preferably located on convex surfaces of the walls within the pot. The top of the pot is flared at 14 and is provided interiorly with a shoulder seat 15 to receive the bottom of another pot when they are stacked one upon the other. The upper ends of the ribs enlarge the area of the seat and serve to compensate for warpage that may occur in the walls. The pot may be provided with a horizontal exterior rib 16, Fig. 7, if desired. Suitable trunnions 17 are provided on the pot for convenience in handling.

I have shown a rectangular pot in the drawings, but the invention may be embodied in round pots or pots of other shapes, if desired; and changes in the form, construction and arrangement of parts of my invention may be made within the scope of the following claims.

I claim:

1. An annealing pot substantially rectangular in shape having rounded corners and vertical corrugations in its walls between and merging into the rounded corners, the concave portions of the corners and the corrugations within the pot having excess metal to provide greater thickness of the walls at these portions.

2. An annealing pot substantially rectangular in shape having its walls thicker and curved at the corners to form rounded portions, and having its walls intermediate the rounded corner portions corrugated, the corrugations which have concave surfaces on the inner surface of the walls being thicker than the remaining corrugations.

ROBERT S. STEWART.